(No Model.)

J. F. & S. J. SANDERS.
ELECTRODE FOR ARC LAMPS.

No. 496,701. Patented May 2, 1893.

Witnesses:

Inventors,
John F. Sanders
Sarah J. Sanders
By Dewey & Co
Atty

UNITED STATES PATENT OFFICE.

JOHN FREDERICK SANDERS AND SARAH J. SANDERS, OF PORTLAND, OREGON.

ELECTRODE FOR ARC LAMPS.

SPECIFICATION forming part of Letters Patent No. 496,701, dated May 2, 1893.

Application filed June 15, 1892. Serial No. 436,830. (No model.)

*To all whom it may concern:*

Be it known that we, JOHN FREDERICK SANDERS and SARAH J. SANDERS, citizens of the United States, residing at Portland, Multnomah county, State of Oregon, have invented an Improvement in Electric-Light Carbons; and we hereby declare the following to be a full, clear, and exact description of the same.

Our invention relates to the class of carbons for use in electric light lamps, and it consists in the novel composition and construction of carbons hereinafter fully described and claimed.

The object of our invention is to produce carbons for electric light lamps which will burn in direct and actual contact with one another, or in contact with other carbons, and which will give a highly efficient, lasting and agreeable light.

Figure 1:
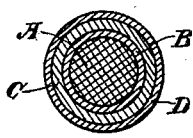
Figure 2:
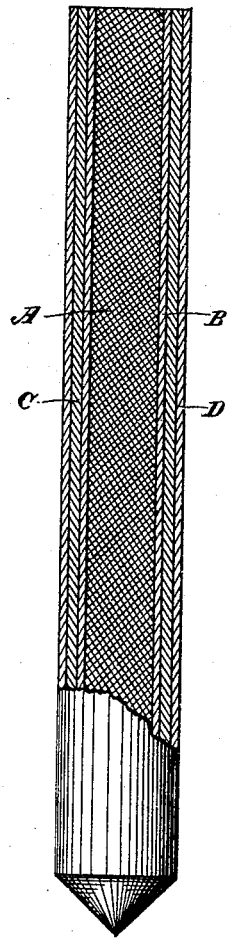

Referring to the accompanying drawings,—Figure 1 is a cross section of our carbon. Fig. 2 is a longitudinal section of same.

Our carbons are made of the following ingredients in substantially the proportion stated, namely: First—pulverized coke, or other suitable carbon, nine hundred and eighty parts. Second—salts of calcium or magnesium, twelve parts. Third—a reducing agent, such as cyanide of potassium, bi-carbonate of soda or phosphoric acid, five parts. Fourth—a coloring metal, such as a salt of strontium, or a salt of lithium, or a salt of indium, three parts. Fifth—a suitable bond, such as gas tar, sugar, mucilage. These ingredients are thoroughly pulverized and well mixed. The mass is then pressed into molds of the required size and form, and these molded forms are then burned until all oils and volatile matter have been expelled and a partial or complete reduction of some of the admixed ingredients has been accomplished. In this composition the pulverized coke serves as the body, and this body may consist of any of the usual carbons employed in this class of manufacture, either natural or artificial; though for practical use, the ordinary common gas retort carbon will be found preferable. The salt of calcium or of magnesium may be the phosphate of either metal, or the oxide. The salt of either may be used according to whether an electro calcium or magnesium light be desired, or both may be used in connection. The function of these metals in the composition is to produce the light, and the use of the salt instead of the pure metal is on account of the less cost of the former. The third ingredient, namely, the reducing agent may be either cyanide of potassium, phosphoric acid or bi-carbonate of soda, or these ingredients may be used together, their function being to reduce the salts of calcium or magnesium to metals; and also they add color to the light. The phosphorus is preferably used in the form of metaphosphoric acid or a salt of phosphorus may be used. The fourth ingredient may be either the chloride or oxide of strontium, or of lithium, or of indium, according to the color of light desired, or they may be all used together, when a complete white light is required, in which a perfect blending is had. Sufficient of the fifth ingredient is added to make a well mixed stiff paste of the whole mass. It will be understood that the proportions of these ingredients may be varied without changing our invention: and also that while we have mentioned various ingredients as equivalents, we do not confine ourselves to them, as other chemical equivalents might be used. This applies to each ingredient mentioned: thus several forms of carbon may be employed to serve as the body: one or more of several metallic salts may be used to give the light: one or more of several reducing agents may be used, and likewise the coloring metals and the bond. Carbons thus prepared will give a perfectly white light which is absolutely steady and requires less than one-twentieth part of electro motive force which is required for an arc light of the same candle power. An electric current of from two to five volts, and from two and one-half to fifty ampères will give in these carbons a light from two hundred and fifty to five thousand candle power. An increase in volume of current or in ampère increases the illuminating power of the light in quadratic proportion of current and vice versa. Hence by reason of this fact the light of these carbons can, at will, be increased or diminished.

It will be observed that all the ingredients other than the pulverized coke do not exceed two per cent. and are chosen according to the requirements. They will last longer with less quantity, but will give more light when used in the proportions substantially as stated, and consume faster.

To the above composition oxide of zinc can be added to increase the illuminating power of the light, especially when burning in vacuum, as this salt becomes highly incandescent when sufficiently heated. The amount of oxide of zinc to be added is from one quarter to one half of one per cent.

A red, blue, yellow, green, or any other colored light may be produced by an excess of the required ingredient, and by taking less or none at all of the other coloring ingredients.

To further increase the efficiency of these carbons, after they are well burned they are electro-plated as follows: First—with a thin coating of copper, which metal is used on account of its adhesiveness to carbon. Second—with a coating of magnesium or calcium, if great illuminating power is required, or with a coating of antimony or zinc, if less light is required; the coating of these metals being deposited directly upon the first coating of copper. This second coating is also of great advantage upon the copper coating of any ordinary carbon, as it will increase its illuminating power. Third—with a coating of silver or copper over the second coating to prevent a too rapid combustion thereof, and to also obtain the greatest possible conductiveness of the electric current over said carbons.

The smaller light should have carbons of correspondingly smaller diameter, and the larger light should have correspondingly larger carbons.

In the accompanying drawings, A represents the carbon, B is the first or copper coating, C is the second coating of magnesium or calcium, or antimony, or zinc, and D is the third coating of silver or copper. More fully stated, these several coatings are for the following purposes: They prevent the burning and wasting away of the sides of the carbons above the point of contact. It is to be observed that these carbons burn very readily under the influence of an electric current. They increase the mechanical strength of the carbons and prevent them from breaking in transportation. They increase the conductivity of the carbons. They increase their light. In applying these coatings, regard must be had to the several physical properties and conditions of each; thus in coating with copper, care must be taken to not have too heavy a deposit which is apt to fuse and thus form a very objectionable slag, or as the heat evolved in the carbon is not more than about one quarter of that of an arc light the coating is apt to remain as a shell and thus hide the light in part or entirely. Copper is the only metal that adheres well to carbon.

With regard to silver, while it adds to the light, it also fuses, if too thick a coating be made.

The magnesium and calcium give a beautiful and strong light, while the zinc and antimony not only increase the light but are fair conductors, and have the peculiar ability to oxidize the metals with which they are in actual contact while they are burning. This is also the case with magnesium and calcium. But these metals unprotected would burn up on the sides of the carbon above the burning point. The first coating of copper is, therefore, more particularly chosen on account of its adhering qualities to the carbon. The second coating of magnesium or of calcium is selected for carbons that are intended for lights of strong illuminating power. The third coating is merely a protection to prevent waste and burning up the sides of the carbon, besides obtaining at the same time the best conductivity. The zinc and antimony may be used as the second coating in cases where no very great illuminating power is required, but are mostly selected to oxidize the copper and silver coatings which is accomplished by a very thin coating.

Having thus described our invention, what we claim as new, and desire to secure by Letters Patent, is—

1. An electric light carbon composed of a homogeneous mass of carbon, a light giving metallic salt, a reducing agent and a binder, substantially as herein described.

2. An electric light carbon composed of pulverized coke or other suitable carbon, the phosphates of calcium and magnesium, cyanide of potassium, bi-carbonate of soda and phosphoric acid, salts of strontium, lithium and indium, and a suitable bond to hold the mass together, substantially as herein described.

3. An electric light carbon composed of pulverized coke or other suitable carbon, the phosphates of calcium and magnesium, cyanide of potassium, bi-carbonate of soda and phosphoric acid, salts of strontium, lithium and indium, oxide of zinc, and a suitable bond to hold the mass together, substantially as herein described.

4. An electric light carbon having a coating of copper and a second coating of an illuminating metal, as magnesium, calcium, antimony or zinc, substantially as herein described.

5. An electric light carbon composed of pulverized coke or other suitable carbon, a salt of calcium or magnesium, a reducing agent as cyanide of potassium, bi-carbonate of soda or phosphoric acid and a coloring metal, as a salt of strontium lithium or indium, said carbon having a coating of copper, and a second coating of an illuminating metal as magnesium, calcium antimony or zinc, substantially as herein described.

6. An electric light carbon composed of pulverized coke or other suitable carbon, a salt of calcium or magnesium, a reducing agent as cyanide of potassium, bi-carbonate of soda or phosphoric acid and a coloring metal as a salt of strontium, lithium or indium, said carbon having a coating of copper, a second coating of an illuminating metal as magnesium, calcium, antimony or zinc, and a third coating of silver or copper, substantially as herein described.

In witness whereof we have hereunto set our hands.

JOHN FREDERICK SANDERS.
SARAH J. SANDERS.

Witnesses:
WM. F. BOOTH,
HOLLAND SMITH.